United States Patent

Beller et al.

[15] 3,658,160
[45] Apr. 25, 1972

[54] SPOT-TYPE DISC BRAKE

[72] Inventors: Hans Albert Beller, Bad Vilbel; Jochen Burgdorf, Offenbach, both of Germany

[73] Assignee: ITT Industries, Inc., New York, N.Y.

[22] Filed: June 22, 1970

[21] Appl. No.: 48,426

[30] Foreign Application Priority Data

June 25, 1969 Germany....................P 19 32 057.1

[52] U.S. Cl.............................................188/73.4
[51] Int. Cl.............................................F16d 65/02
[58] Field of Search.............188/73.3, 73.4, 73.5, 73.6, 188/205 A

[56] References Cited

UNITED STATES PATENTS

| 3,590,961 | 7/1971 | Airheart | 188/73.4 |
| 3,265,160 | 8/1966 | Elberg et al | 188/73.6 |
| 3,363,727 | 1/1968 | Thirion | 188/73.4 |
| 3,403,756 | 10/1968 | Thirion | 188/73.3 |
| 3,414,090 | 12/1968 | Hambling | 188/73.3 |

*Primary Examiner*—George E. A. Halvosa
*Attorney*—C. Cornell Remsen, Jr., Walter J. Baum, Paul W. Hemminger, Charles L. Johnson, Jr., Philip M. Bolton, Edward Goldberg, Isidore Togut and Menotti J. Lombardi, Jr.

[57] ABSTRACT

A floating spot-type disc brake having a fired brake carrier and a floating sheet metal frame which supports the actuating piston and transmits the actuating force from one side of the disc to the brake shoe on the other side of the disc. The frame and carrier are held in a parallel position in which they are spaced slightly from each other by means of springs urging them apart and restraining arms on either the carrier and/or the frame. The arms are perpendicular to the frame and carrier and terminate in bearing or contact surfaces facing the part to which the arm is attached for limiting the movement of the parts away from each other.

15 Claims, 8 Drawing Figures

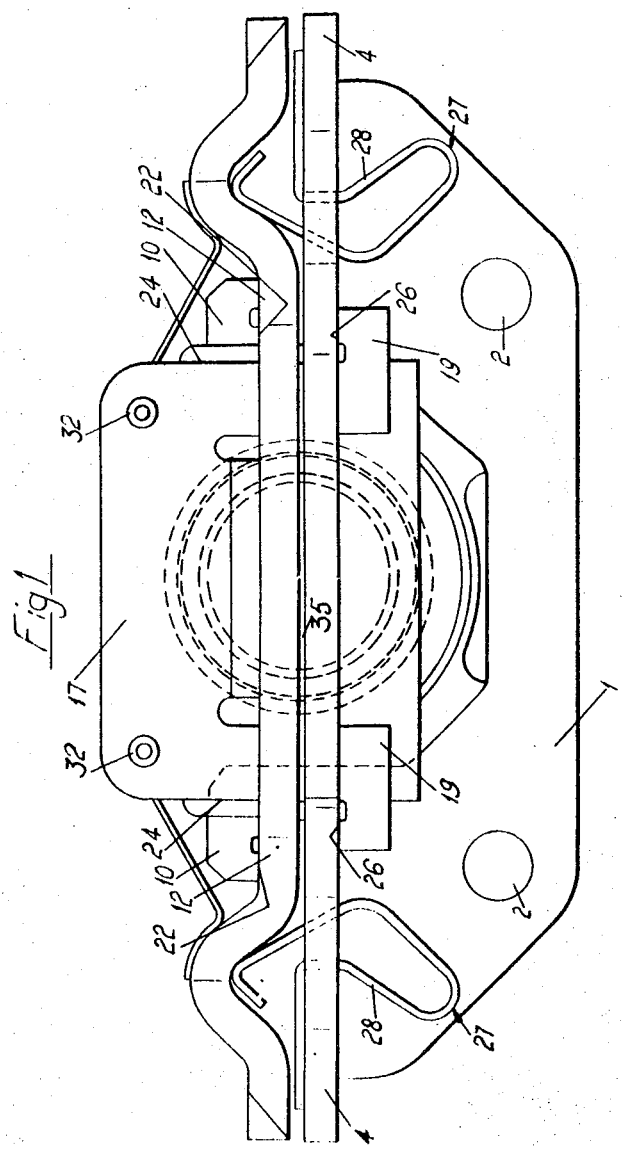

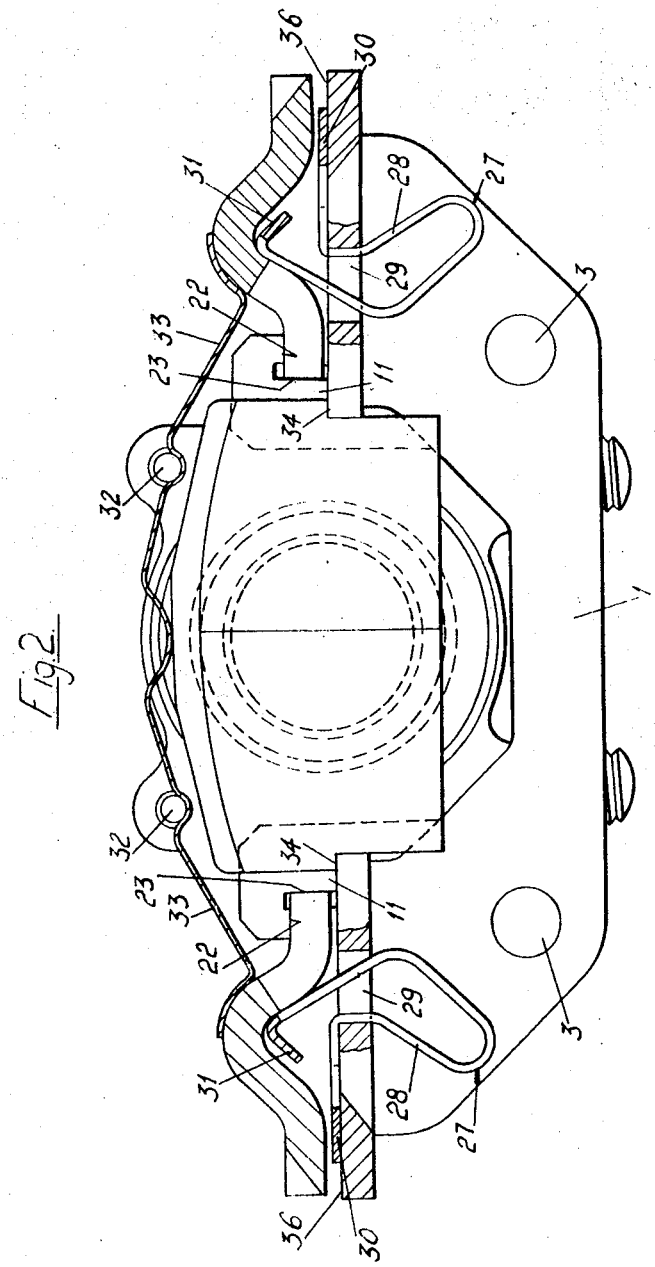

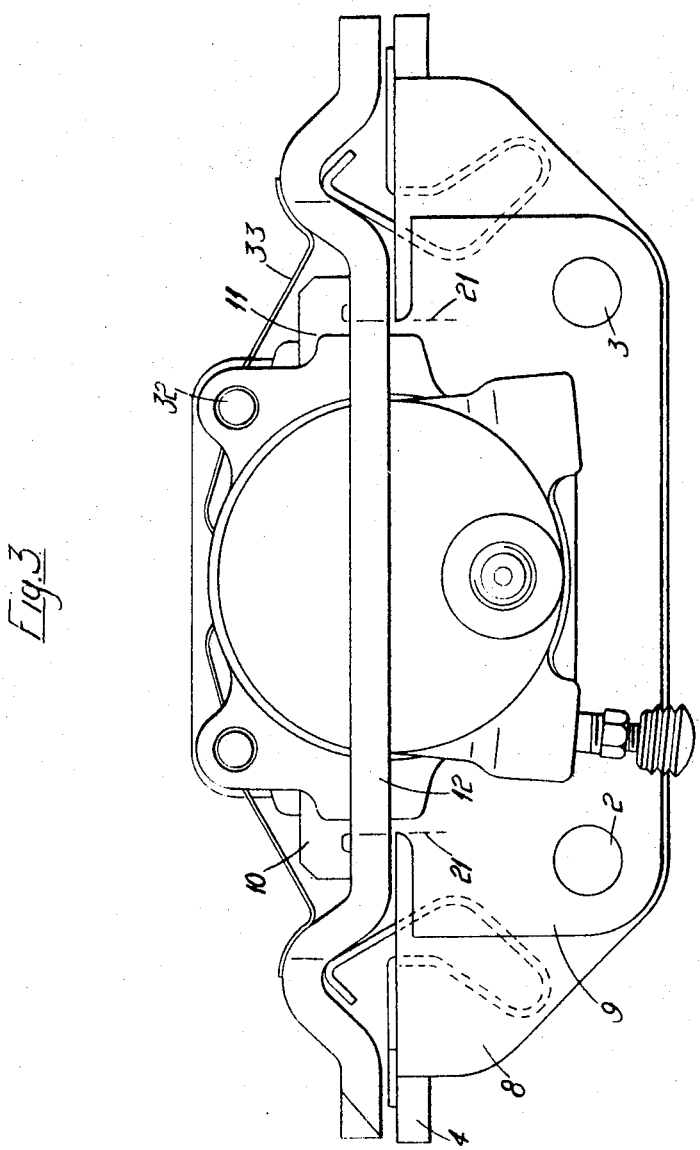

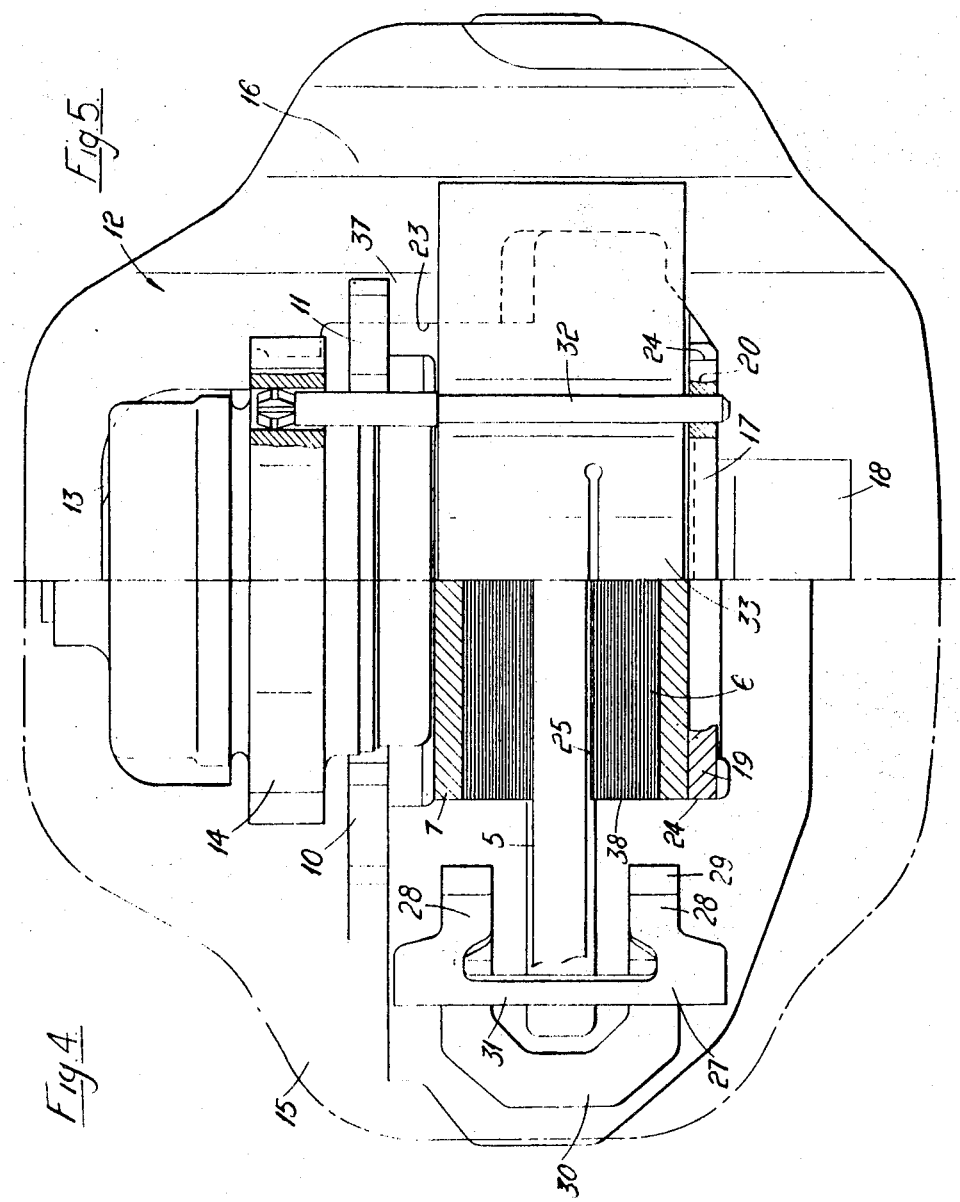

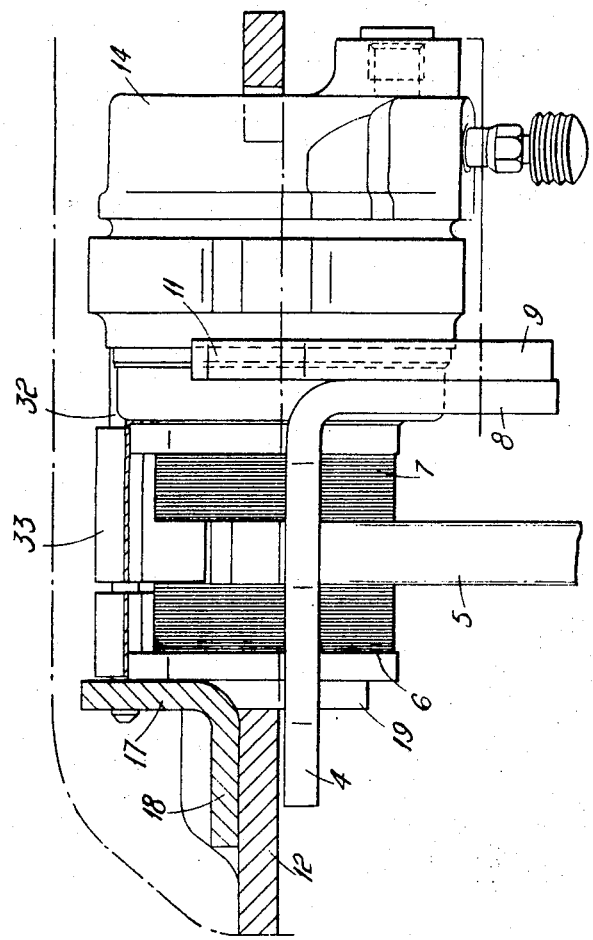

3,658,160

SPOT-TYPE DISC BRAKE

BACKGROUND OF THE INVENTION

1. Field of the Invention

This invention relates to vehicle disc brakes of the floating type having an axially fixed rotating disc, an actuator on one side of the disc acting directly on a brake shoe and means for transmitting the actuating force to the brake shoe on the other side of the disc and particularly to a disc brake of this type in which the actuating force is transmitted by a relatively flat movable sheet metal frame.

2. Description of the Prior art

In the design of disc brakes of the floating type it is important that the floating parts be free to move easily in an axial direction and that dirt and corrosion do not reduce this freedom and cause jamming of the floating parts. It is desirable to achieve this without the use of close manufacturing tolerances which add to the cost of the brakes. In addition, the parts of the brake should be easy to assemble and service.

German Pat. No. 1,206,673 discloses one attempt to solve these problems. The brake shown in the patent has a force transmitting frame which is pivoted on a joint bolt attached to a fixed carrier adjacent to the edge of the brake disc. A disadvantage of this invention is that the angle of the brake pads with respect to the disc changes due to the turning of the frame about the joint causing the brake pads to bind and jam on the brake carrier. If the clearance between the backing plates of the brake pads and the supporting surfaces on the brake carrier are increased to avoid jamming, the brakes tend to chatter and rattle when mounted on a vehicle. In addition, the free tilting of the brake pads causes uneven wear on the pads. Another disadvantage of this brake is that a failure of the single link between the brake carrier and the movable frame results in a separation of the frame from the carrier.

French Pat. No. 1,309,863 discloses another spot-type disc brake of this type in which a frame is arranged to float on a brake carrier for trans-mitting the force from an actuator on one side of the disc to the brake pad on the other side of the disc. The brake shown in this patent has an actuating cylinder which is adapted to move between guiding surfaces on the fixed brake carrier. The frame is guided by the actuating cylinder and by the brake shoes located in an opening in the brake carrier and frame. The frame is held against the brake carrier by means of springs which engage both parts. A disadvantage of this invention is that a build-up in manufacturing tolerances in the width of the opening and brake shoes can result in increased wear as well as chattering and rattling. This problem can be reduced somewhat by means of an additional spring. However, as with the case of the German patent discussed above, a failure of one of the springs holding the frame on the brake carrier may result in the separation of the frame and the brake carrier to cause a catastrophic failure of the brake system.

SUMMARY

It is an object of this invention to provide a spot-type floating disc brake which is easy to assemble and service, not subject to jamming and inexpensive to manufacture.

It is a further object of this invention to provide a disc brake which has these features and which will remain assembled to prevent a catastrophic failure in the event that there is a failure in one or two of the connecting elements.

This invention achieves these objects by providing a relatively flat forced transmitting frame having a central opening adapted to embrace a section of the brake disc while the frame is held in a plane perpendicular to the plane of the disc and passing through a line forming a chord on the disc surface. A fixed brake carrier supports and guides the frame, the carrier having one relatively flat surface parallel to the frame. The frame and carrier are held in a parallel position in which they are spaced slightly from each other by means of springs urging them apart and restraining arms on either the carrier and/or the frame. The arms are perpendicular to the frame and carrier and terminate in bearing or contact surfaces facing the part to which the arm is attached for limiting the movement of the parts away from each other. The other part which is positioned between the end of the arm and the part to which the arm is attached, is held against the contact surfaces by the springs. In this manner the movement of the frame is controlled and the contact area between the frame and the carrier limited. The carrier and frame remain parallel and separated by a fixed clearance which prevents binding of the parts caused by an accumulation of dirt between the parts.

In one embodiment of the invention the fixed brake carrier and the floating frame are manufactured from sheet metal stock to produce a particularly simple and inexpensive brake. The brake frame is manufactured from two separate sheet metal parts which are welded or otherwise permanently attached. One part is the relatively flat sheet metal frame having a central opening within which are fitted the actuating cylinder, brake pads and brake disc, while the second is a sheet metal guide part having a flat section including arms which are manufactured by a punch process and a central portion which is bent out of the basic plane to a position at right angles to the arms. A lug on this bent portion is welded or other wise attached to the frame so that the end assembly includes a frame section and a perpendicular guiding part including the two arms. When the brake is assembled the guiding part provides an enlarged contact area for the brake pad backing plate to reduce surface pressure.

The fixed brake carrier is also formed from two sheet metal parts which are welded or otherwise permanently connected. One part is L-shaped and has a central opening in one leg which fits around the brake shoes and disc. The other side includes bolt holes for mounting the carrier to a non-rotating part of the wheel suspension or vehicle frame. Welded to this part is a flat sheet metal guide part which is punched out in a U-shaped configuration, the central portion of which is connected to the bent-off portion of the brake carrier thus reinforcing the brake carrier where it is attached to the vehicle. In this manner the brake carrier assembly has a relatively flat portion adapted to lie in a plane parallel to the disc axis and passing through a chord in the disc and guide arms which are perpendicular to the plane.

The guide arms which terminate in contact surfaces facing the part to which the arms are attached, are sized so that when the brake carrier and frame are assembled and forced apart by springs acting between the carrier and the frame, the frame and carrier will remain separated and parallel with a clearance between them.

The carrier and frame are both dimensioned so that they can only be disassembled by moving the up-standing guide parts toward each other while keeping the frame and carrier parallel until the contact surfaces disengage allowing the parts to be separated. This movement can only occur when the brake assembly is removed from the disc which projects through the central openings in both the carrier and frame. In this manner the separation of the parts while the brake is mounted in a vehicle is prevented.

In one of the preferred embodiments described the springs arranged between the frame and the carrier to separate the parts and press the carrier and frame against their contact surfaces on the free ends of the arms consist of two spring straps which are bent into U-shaped loops one on each side of the brake disc. The ends of the springs are connected by cross pieces which lie against the frame and the brake carrier to distribute the spring force. These springs are secured against axial displacement and tilting or jamming by providing openings in the brake carrier on both sides of the disc in which the loops of the spring are held. In another embodiment helical springs are provided between the frame and the brake carrier instead of the strip springs, the helical sections being arranged on each side of the brake disc and connected by a U-shaped bracket which bridges the brake disc. The free ends of the springs form arms perpendicular to the axis of the springs, the ends of the arms being supported on the frame and brake carrier. The springs are secured against axial displacement by providing openings in the brake carrier into which the spring bodies are fitted.

The frame may be reinforced and its cross section subject to tensile stress enlarged by bending the ends of the frame out of the plane of the frame along lines parallel to the disc axis.

With this construction the tangential forces and shocks acting on the frame can be damped by designing the separating springs so that the springs bear against the bent-off portion of the frame to divide the spring force into two component parts, one perpendicular to the plane of the frame and the other parallel to the plane and tangent to the disc.

The brake disclosed herein is very well suited to mass production while extremely lightweight and inexpensive to manufacture. The weight of the brake assembly is particularly important since the brake, when it is installed in the vehicle, contributes directly to the unsprung mass of the vehicle.

In addition to these advantages the present invention provides a brake which can be assembled without any special tools and which is not subject to fouling and corrosion so that the brake can be mounted on the vehicle without special protection.

BRIEF DESCRIPTION OF THE DRAWINGS

FIG. 1 is an axial view of a spot-type brake assembly embodying the present invention;

FIG. 2 is a partial view similar to FIG. 1 with part of the brake frame guide section removed to show the brake shoe and carrier guide arm;

FIG. 3 is an axial view of the brake assembly of FIG. 1 taken in the opposite direction;

FIG. 4 is a plan view of the brake of FIG. 1 taken in a radial direction with the cover and brake frame removed for clarity;

FIG. 5 is a view similar to FIG. 4 showing the cover, brake frame and the brake shoe guide pins;

FIG. 6 is a partially sectioned side view of the brake shown in FIG. 1 viewed in a direction parallel to the plane of the disc;

DESCRIPTION OF THE PREFERRED EMBODIMENTS

Figure 7:
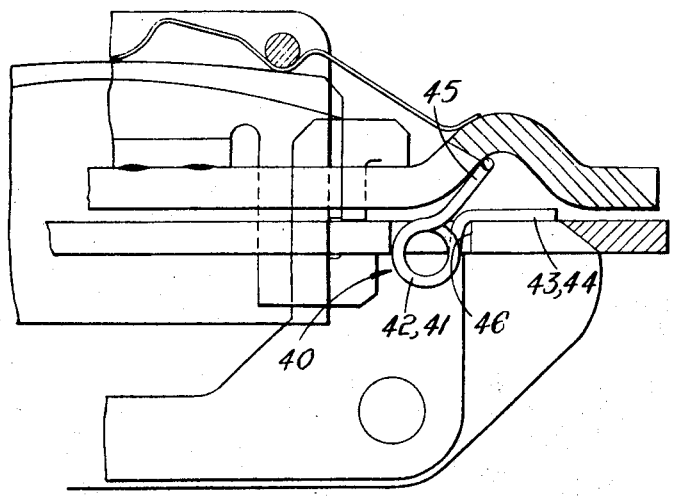
FIG. 7 is a partial sectional view showing another embodiment of the invention.

Referring to FIGS. 1–6 there is shown a brake assembly having a fixed brake carrier 1 with bolt holes 2 and 3 for mounting the brake assembly to the stub axle or other fixed part of the vehicle. The brake carrier 1 comprises a flat plate 4 which embraces the brake disc 5, the carrier having a central opening for receiving the brake shoes 6 and 7 and a section 8 which is bent off to form the attaching section. The bent-off section 8 of the brake carrier 1 is welded or otherwise fastened to a flat U-shaped guiding part 9 having arms 10 and 11. The brake carrier which guides and holds the other parts of the brake transmits the braking forces to the non-rotating part of the vehicle.

A frame 12 arranged to move freely in a direction parallel to the disc brake axis is mounted parallel to the section of the carrier having the opening through which the disc protrudes. The frame has an opening for receiving a hydraulic actuating cylinder 14. The actuating cylinder has axially extending grooves which fit into projections on the frame. The frame includes side portions 15 and 16 parallel to the brake disc axis for transmitting the actuating force of the hydraulic actuator arranged on one side of the brake disc and acting directly upon the brake shoe 7 to the brake shoe 6 arranged on the other side of the brake disc. The brake shoe 6 is supported for movement on the frame by means of U-shaped guide pieces 17, the guiding piece being welded or otherwise fixed to the frame 12 by means of a lug 18 which is bent off in a direction perpendicular to the basic plane of the guide piece 17.

Arms 10 and 11 of the guide part 9 attached to the brake carrier 1 and arms 19 and 20 of the guide piece 17 attached to the frame 12 serve to hold and guide the frame 12 on the brake carrier 1. The arms 10 and 11 project into the opening in the frame and lie with their outward facing guide surfaces 21, on the guiding surfaces 23 which are parallel to one another and limit the frame opening in this area. The ends of the arms 10 and 11 embrace the frame and provide the surfaces 22 on which the frame is supported in a radial direction. The arms 19 and 20 project through the opening in the frame into the opening of the brake carrier to receive the shoes 6 and 7 so that they lie with their guided surfaces 24 facing away from each other and parallel to supporting surfaces 25 for the brake shoe 6. The ends of the arms 19, 20 grip under the brake carrier 1 and support the frame 12 with their guiding surfaces 26 on the surface of the brake carrier facing the brake disc axis. The distance between the surfaces 21 on the guiding part 9 is slightly greater than the distance between the contact surfaces 23 on the frame 12 and the distance between the surfaces 24 on the guide part 17 is slightly greater than the distance between the contact surfaces 25 on the brake carrier 1 to provide the necessary clearance.

In order to avoid contact between the facing surfaces on the frame and on the brake carrier which might impair the displacability of the frame with respect to the brake carrier the distance between the contact surfaces 22 on the ends of the arms 10, 11 and the surfaces on the brake carrier facing the ends of the arms as well as the distance between the contact surfaces 26 on the ends of the arms 19, 20 and the surface of the frame facing the ends of the arms is larger, by an amount equal to the necessary clearance, than the thickness of the parts of the brake carrier and the frame lying between said surfaces. Springs 27 whose tensile force tends to lift the frame from the brake carrier are provided for maintaining the clearance between the facing surfaces of the frame and the brake carrier. In this way the frame is supported on the brake carrier only by the small surfaces 22,26 so that the adhesion can be overcome by the actuator in case the frame and brake carrier corrode.

The springs 27 are made of two sheet metal bands 28 bent into U-shaped loops and passed through openings 29 which are arranged in the brake carrier on both sides of the brake disc. The ends of the bands which lie in the region between the brake carrier and the frame and which are supported on the frame and the brake carrier, are connected with each other by cross-pieces 30, 31. By the loop-like embodiment of the springs a flat characteristic of the spring is achieved so that a difference in the elastic forces of the springs caused by the different length of the chucking spaces which results from inaccurate manufacturing remains insignificant and the force which has to overcome the friction and to displace the frame is substantially the same for all the brakes manufactured in a production run.

Further, due to the loop-like shape the resilience of the spring can be kept low even when employing relatively thick sheet metal for the spring which would be less sensitive to corrosion. Due to the broad bearing surface of the springs a tilting of the frame or a jamming of the spring during brake actuation is avoided.

The brake shoes provide a step 34 in their lateral front faces for the support in radial direction. By means of this step the brake shoes are supported on the surface of the brake carrier towards the axis of the brake disc. The brake shoes are held in this position by a cover 33 which is passed under holding pins 32 engaging into bores in the actuating cylinder and the guiding part 17. The cover lies with its ends on the surface of the frame.

In order to reinforce and to adapt the frame to the outline of the disc both sides of the frame 15, 16 which project over the periphery of the brake disc are bent several times in the plane parallel to the disc brake axis. Since the ends of the springs 27 which are connected with the cross-piece 31, lie against a surface formed by the bend and located at an angle of 45° with respect to the frame plane, the springs 27 act upon the frame parallelly and perpendicularly to the plane of the frame so that the frame is pressed against the contact surfaces 22 and 26 at the ends of the arms 10, 11, 19, 20. At the same time shock stresses parallel to the plane of the frame are received and damped. In this way the wear of the brake is reduced.

Figure 8:
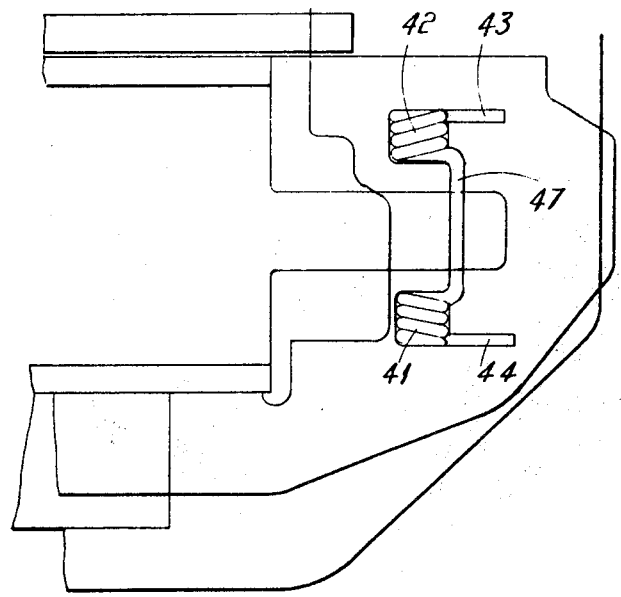
FIG. 8 is a plan view of the embodiment shown in FIG. 7.

FIGS. 7 and 8 illustrate another embodiment of the invention. This embodiment is similar to that shown in FIGS. 1-6 except for the construction and mounting of the separating springs.

Each spring consists of two coil springs 41,42 wound of spring wire and connected with each other by a bracket 47. The free ends 43,44 of the coil spring are bent at a right angle to the central axis of the coil springs and have approximately the same length as the two sides 45 of the U-shaped bracket 47. The springs are arranged in the brake carrier in such a way that the coil spring parts 41 and 42 are placed in openings 46 in the brake carrier on both sides of the brake disc and the U-shaped bracket acts with its central portion upon the frame and with the free ends upon the brake carrier.

In order to assemble the brake in a simple manner without special tools the parts of the frame and the brake carrier which cooperate with the guiding surfaces 21, 22, 24, 26 on the arms of the guiding pieces 9, 17, are limited in their length towards the brake disc axis to the same extent so that when the brake shoes 6,7 have been removed - a displacement of the frame with respect to the brake carrier 1 beyond the length of the parts on the frame and the brake carrier disengage the surfaces 21, 22, 24, 26 from the respective opposite surfaces 25, 23 on the frame and the brake carrier and the frame can be lifted from the brake carrier. When the frame has been removed the springs 27 or 40 are then exposed and can also be removed from the opening in the brake carrier. In order to prevent the frame from separating and lifting away from the brake carrier for instance due to a defective element of the brake, the length of the parts of the frame and the brake carrier which cooperate with the contact surfaces on the guidance pieces 9,17 is designed in such a way that an axial displacement of the frame - necessary for the removal of the frame from the brake carrier - is only possible when the frame with its side which lies opposite the actuating applicance, covers the opening in the brake carrier for the brake disc. As long as the brake is assembled on the vehicle with the brake disc extending through the opening in the brake carrier the frame cannot be moved with respect to the brake carrier into a position which would allow the frame to be lifted from the brake carrier.

While we have described above the principles of our invention in connection with specific apparatus it is to be clearly understood that this description is made only by way of example and not as a limitation to the scope of my invention as set forth in the accompanying claims.

We claim:

1. A spot-type disc brake with a rotating brake disc, a non-rotating brake carrier member having an opening for embracing the edge of the brake disc and holding a brake shoe on either side of the disc and an axially displaceable frame member parallel to the carrier having an opening for embracing the brake disc and transmitting the force of an actuator arranged on one side of the brake disc for acting directly on one brake shoe and indirectly on the brake shoe on the other side of the brake disc, wherein the improvement comprises a plurality of springs disposed between the carrier member and the frame member urging the frame member away from the carrier member, and a plurality of arms axially spaced on opposite sides of the disc and extending from both the carrier and frame members in a perpendicular relation between the carrier member and the frame member to hold the frame member parallel to and spaced from the carrier member, each arm terminating in a bearing and guiding surface for the relative motion of the carrier and frame members parallel to and facing the one of the carrier and frame members to which the arm is attached, the bearing and guiding surface bearing against the outside surface of the other of the carrier and frame members, the springs holding the carrier and frame members apart and in engagement with the bearing and guiding surface of each of the arms.

2. The spot-type disc brake of claim 1 wherein each of the springs between the frame member and the brake carrier member consist of two metal sheet bands bent into substantially a U-shaped loop, one of the springs being disposed on each side of the brake disc, the adjacent ends of each of the springs being connected with each other by cross-pieces, one of the cross-pieces resting on a surface of frame member and the other of the cross pieces resting on the adjacent surface of the brake carrier member.

3. The spot-type disc brake of claim 2, wherein the brake carrier member has an aperture on each side of the brake disc and the loop of each of the springs passes through a different one of the apertures.

4. The spot-type disc brake of claim 1 wherein the springs between the frame member and the brake carrier member consist of two coil springs, each of the coil springs being on opposite sides of the brake disc and connected with each other by a U-shaped bracket bridging the brake disc, the free ends of the coil springs forming arms perpendicular to the axis of the spring, the central portion of the bracket resting on the frame member and the free ends of the coil springs resting on the brake carrier member.

5. The spot-type disc brake of claim 4 wherein the brake carrier provides apertures on opposite sides of the brake disc to receive the coil springs.

6. The spot-type disc brake of claim 1 wherein the sides of the frame member are bent several times out of the basic plane which is parallel to the axis of the brake disc.

7. The spot-type disc brake of claim 6 wherein the springs are disposed in the region of the bent sides to act upon the frame member in such a way that the spring force is divided into two components, one perpendicular and the other parallel to the frame member plane.

8. The spot-type disc brake of claim 1 wherein the arms extend through the opening in the other of the carrier and frame members and terminate in ends which are offset in a direction parallel to a line tangent to the disc.

9. The spot-type disc brake of claim 8 wherein a pair of arms are spaced in a circumferential direction, the distance between the arms being slightly less than the distance across the opening.

10. The spot-type disc brake of claim 9 including a pair of circumferentially spaced arms attached to the frame member and a pair of circumferentially spaced arms attached to the carrier member.

11. The spot-type disc brake of claim 10 wherein the frame member is an assembly formed from two sheet metal parts rigidly connected together, one part being a relatively flat frame part having an elongated opening through which the disc protrudes and the other being a guide part perpendicular to the frame part, the arms extending from the guide part.

12. The spot-type disc brake of claim 10 wherein the brake carrier member is an assembly formed from two sheet metal parts rigidly connected together, one part being a carrier part with a flat surface parallel to the flat frame part and a section bent perpendicular to the flat surface and having means for mounting the carrier member on a fixed part of the vehicle, the other part being a guide part attached to a bent-off portion of the carrier part, the arms extending from the guide part.

13. The spot-type disc brake of claim 12 wherein the arms on the brake carrier member which guide the frame member are a U-shaped component part punched out of given thickness sheet metal, the U-shaped component part being undetachably connected with the bent-off portion of the brake carrier member.

14. The spot-type disc brake of claim 13 wherein the axial length of the openings in the carrier and frame members, cooperating with the bearing and guiding surfaces on the ends of the arms, is limited to the same extent on the frame member and on the brake carrier member so that the guide parts disengage the bearing and guiding surfaces on the arms when the frame member is displaced with respect to the brake carrier member by an amount corresponding to the axial length of the guide parts, and the frame member can then be removed from the brake carrier member.

15. The spot-type disc brake of claim 14 wherein the axial length of the guide parts on the frame member and on the brake carrier member is larger than the breadth of the opening in the frame member for the brake disc whereby the frame member and carrier member cannot be separated while positioned over the disc.

* * * * *